United States Patent
Thierry et al.

(10) Patent No.: US 7,441,764 B2
(45) Date of Patent: Oct. 28, 2008

(54) FEEDER MECHANISM FOR A PACKAGING MACHINE

(75) Inventors: Willy Thierry, Chateauroux (FR); Lilian Joseph, Ardentes (FR)

(73) Assignee: Mead Westvaco Packaging Systems, LLC, Glen Allen, VA (US)

( * ) Notice: Subject to any disclaimer, the term of this patent is extended or adjusted under 35 U.S.C. 154(b) by 203 days.

(21) Appl. No.: 11/301,547

(22) Filed: Dec. 13, 2005

(65) Prior Publication Data

US 2006/0160686 A1 Jul. 20, 2006

Related U.S. Application Data

(63) Continuation of application No. PCT/US2004/018693, filed on Jun. 12, 2004.

(30) Foreign Application Priority Data

Jun. 13, 2003 (GB) ................................. 0313731.2

(51) Int. Cl.
*B65H 3/12* (2006.01)
(52) U.S. Cl. .......................................... 271/94; 271/95
(58) Field of Classification Search .................... 271/94, 271/95; 493/122, 123
See application file for complete search history.

(56) References Cited

U.S. PATENT DOCUMENTS

| 3,127,027 | A |   | 3/1964  | Roser |
|---|---|---|---|---|
| 3,176,978 | A |   | 4/1965  | Baker et al. |
| 4,735,600 | A | * | 4/1988  | Drewke et al. ............... 493/314 |
| 5,054,761 | A | * | 10/1991 | Dietrich et al. ................ 271/95 |
| 5,061,231 | A | * | 10/1991 | Dietrich et al. ............. 493/315 |
| 5,511,772 | A |   | 4/1996  | Ganz et al. |
| 6,357,623 | B1 |  | 3/2002  | Biehl et al. |
| 6,554,268 | B1 | * | 4/2003 | Keller et al. ................... 271/11 |

FOREIGN PATENT DOCUMENTS

| DE | 3801788 A1  | 7/1989  |
|---|---|---|
| DE | 19700236 C  | 7/1998  |
| EP | 0590568 A   | 4/1994  |
| EP | 1136363 A   | 9/2001  |
| EP | 1262410 A   | 12/2002 |
| GB | 554905 A    | 7/1943  |
| GB | 2053133 A   | 2/1981  |

* cited by examiner

*Primary Examiner*—David H Bollinger
(74) *Attorney, Agent, or Firm*—Tsugihiko Suzuki; Karen L. Ware

(57) ABSTRACT

An apparatus for sequentially manipulating from a supply point of a hopper carton blanks each having a contacting panel and for transferring the blanks to an in-feed end of a packaging machine. The apparatus comprises carton pick up means for sequentially engaging the contacting panel and for withdrawing from the hopper a blank. The carton pick up means is supported by a holder frame that is connected to a swingable collar structure to move the blank in a first direction transverse to the contacting panel of the blank in the hopper. The holder frame is slidably connected to the collar structure through rods to move the blank in a second direction transverse to the first direction to transfer the blank to the in-feed end for further processing.

10 Claims, 4 Drawing Sheets

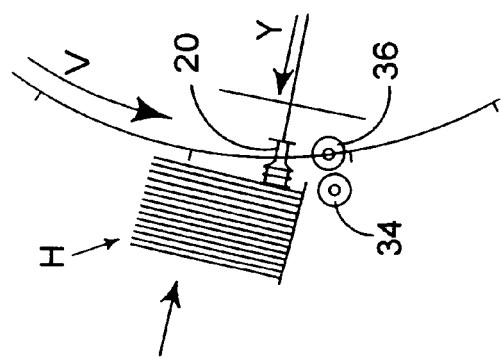
FIGURE 4
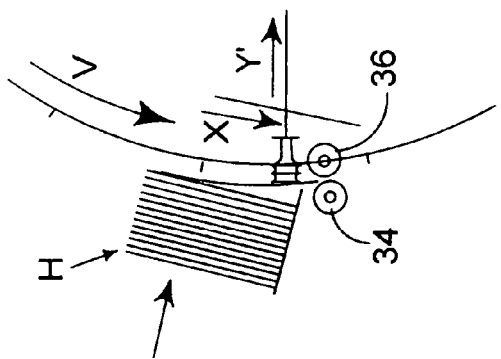
FIGURE 5
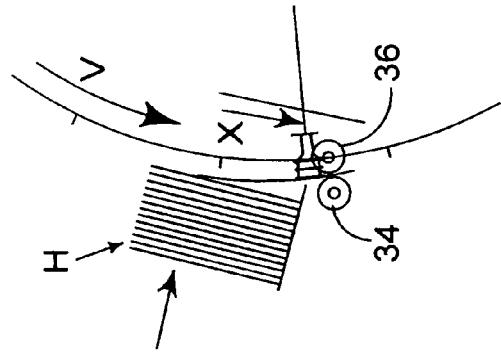
FIGURE 6
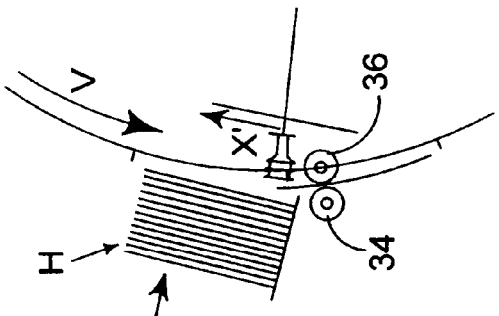
FIGURE 7
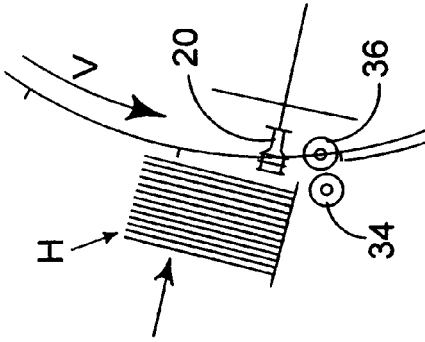
FIGURE 8
FIGURE 9

FEEDER MECHANISM FOR A PACKAGING MACHINE

This is a continuation of international application No. PCT/US2004/018693, filed Jun. 12, 2004, which is hereby incorporated by reference.

BACKGROUND OF THE INVENTION

This invention relates to packaging of primary articles such as cans or bottles in cartons and is more particularly concerned with feeding the cartons in collapsed condition from a hopper and for transferring the cartons to an in-feed end of a packaging machine.

UK Patent GB 2 053 133 to Bosch concerns an apparatus for removing, folding box blanks from a stationary magazine and erecting and transferring the blanks. It comprises transfer suction members which are mounted on four point linkages and arranged on a rotary carrier controlled by cams. During rotation, to facilitate the removal of the blanks a stationary condition of the suction members occurs. During the transfer of the erected blanks to the transport device, the suction members are moved synchronously with the transport device.

U.S. Pat. No. 4,625,575 to Le Bras concerns a cam assembly for a feeder mechanism in which the cam plate is formed for a continuous cam track and a shallower cam track. Cam track follower arms are used for relative movement within first and second cam tracks. Pick up means is connected to the cam arm by an eccentric arm and the cam tracks because the pick up means to move to an outwardly extended position and to an inwardly retracted position.

German patent DE 3 525 448 to I.M.A. concerns an apparatus for feeding and erecting collapsed cartons from a hopper mounted at an angle from the vertical. The apparatus comprises a rotatable frame to which vacuum cups are attached via a linkage. As the frame rotates, the suctions cups retract so as to remove the collapsed cartons from the hopper and then to simultaneously transfer the collapsed cartons whilst separating the walls thereof. The retractable linkage is complex and, therefore, expensive to manufacture and maintain.

In WO 98/52825, there is shown a rotary feeder mechanism to supply blanks from an inclined hopper.

The prior art highlighted above refers to carton pick up means that rotates continuously, to cause the cartons to be withdrawn and accelerated to match the machine throughput speed. One problem associated with the transfer of cartons is that by combining the withdrawal and acceleration functions limits the machine speeds because a carton withdrawn by a rotary feeder is restricted by the rotary action.

The present invention and its preferred embodiment seeks to overcome or at least mitigate the problems associated with the prior art.

SUMMARY OF THE INVENTION

In one aspect of the invention, there comprises, an apparatus for sequentially manipulating from a supply point of a hopper collapsed cartons having oppositely disposed face contacting panels and for transferring the cartons to an in-feed end of a packaging machine, which apparatus comprising carton pick up means for sequentially engaging one of said face contacting panels and for withdrawing from the hopper a collapsed carton. The carton pick up means is connected to a shaft by a frame and moveable to move the blank in a transverse plane to the flow of cartons, the frame being slidably secured on a collar structure to move the frame in a linear action relative to a rotatable transfer mechanism, to transfer the carton on for further processing.

Optionally, the carton is transferred to acceleration means to be accelerated to match the velocity of the packaging machine.

In some embodiments, the linear movement of the carton pick up means immediately prior to and during withdrawal of a carton from the hopper is arrested for a brief interval by the action of a cam controlled cam bar which is movable radially during such brief interval and which is operably connected with the carton pick up means.

In other embodiments, the carton pick up means comprises a vacuum supply and a suction cup.

A controller may be provided to control the velocity of the transverse and linear motions and, as the case may be, the acceleration means.

A second aspect of the invention provides a method of sequentially manipulating from a supply point of a hopper collapsed cartons having oppositely disposed face contacting panels and for transferring the cartons to an in-feed end of a packaging machine, which method comprises the steps of withdrawing a carton in a transverse direction to the flow of cartons lowering the cartons to an accelerating means and accelerating the carton to match the speed of the transfer apparatus at the in-feed of the machine.

BRIEF DESCRIPTION OF THE DRAWINGS

Exemplary embodiments of the invention will now be described, by way of example only, with reference to the accompanying drawings in which:

FIGS. 4 to 9 are fragmentary schematic views each similar to FIG. 3, illustrating the process of feeding a blank from a hopper to the transfer mechanism.

DETAILED DESCRIPTION OF THE PREFERRED EMBODIMENT

Figure 1:
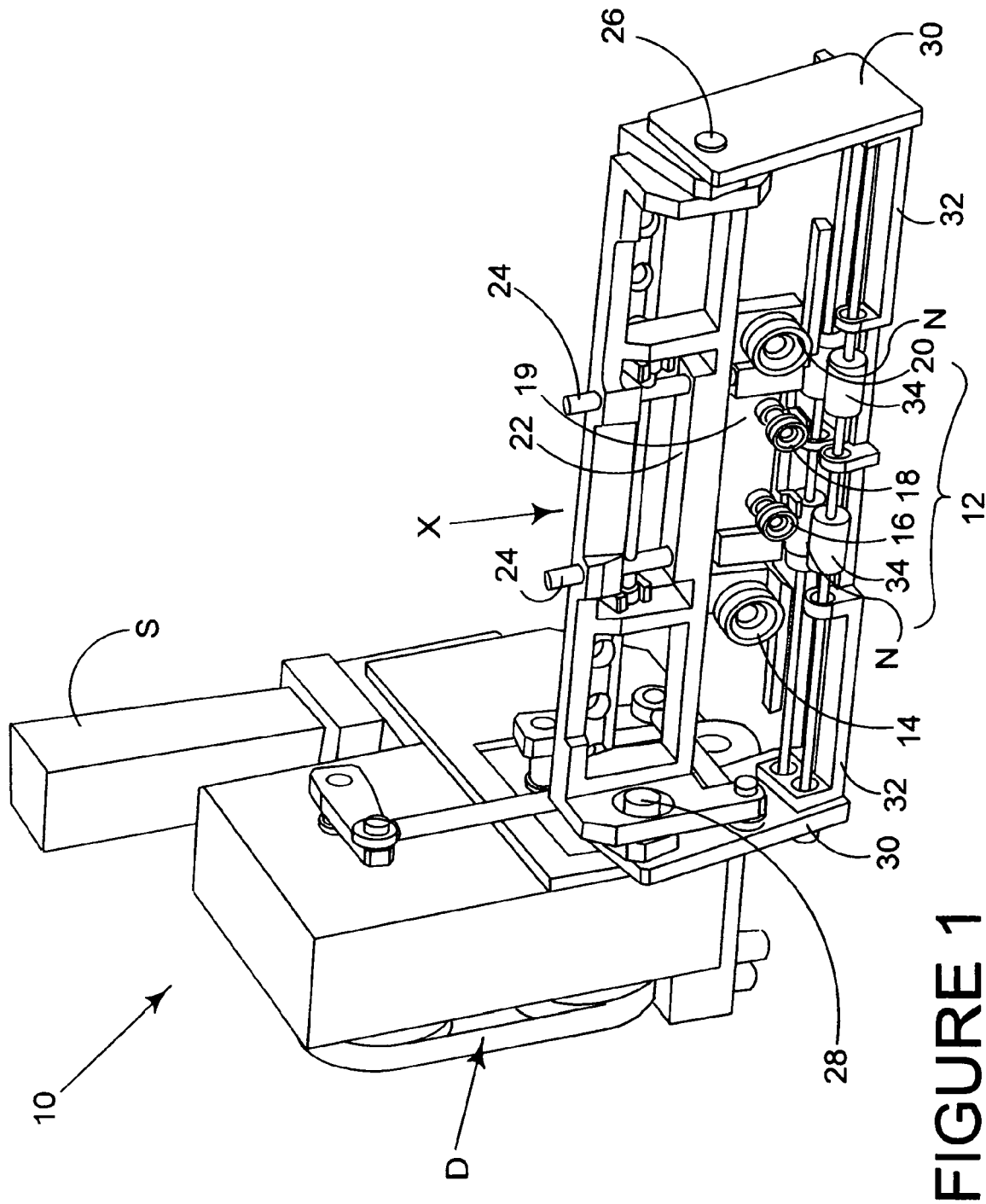
FIGS. 1 and 2 are perspective views of the carton blank feeder mechanism of a packaging machine according to one aspect of the invention.
Figure 2:
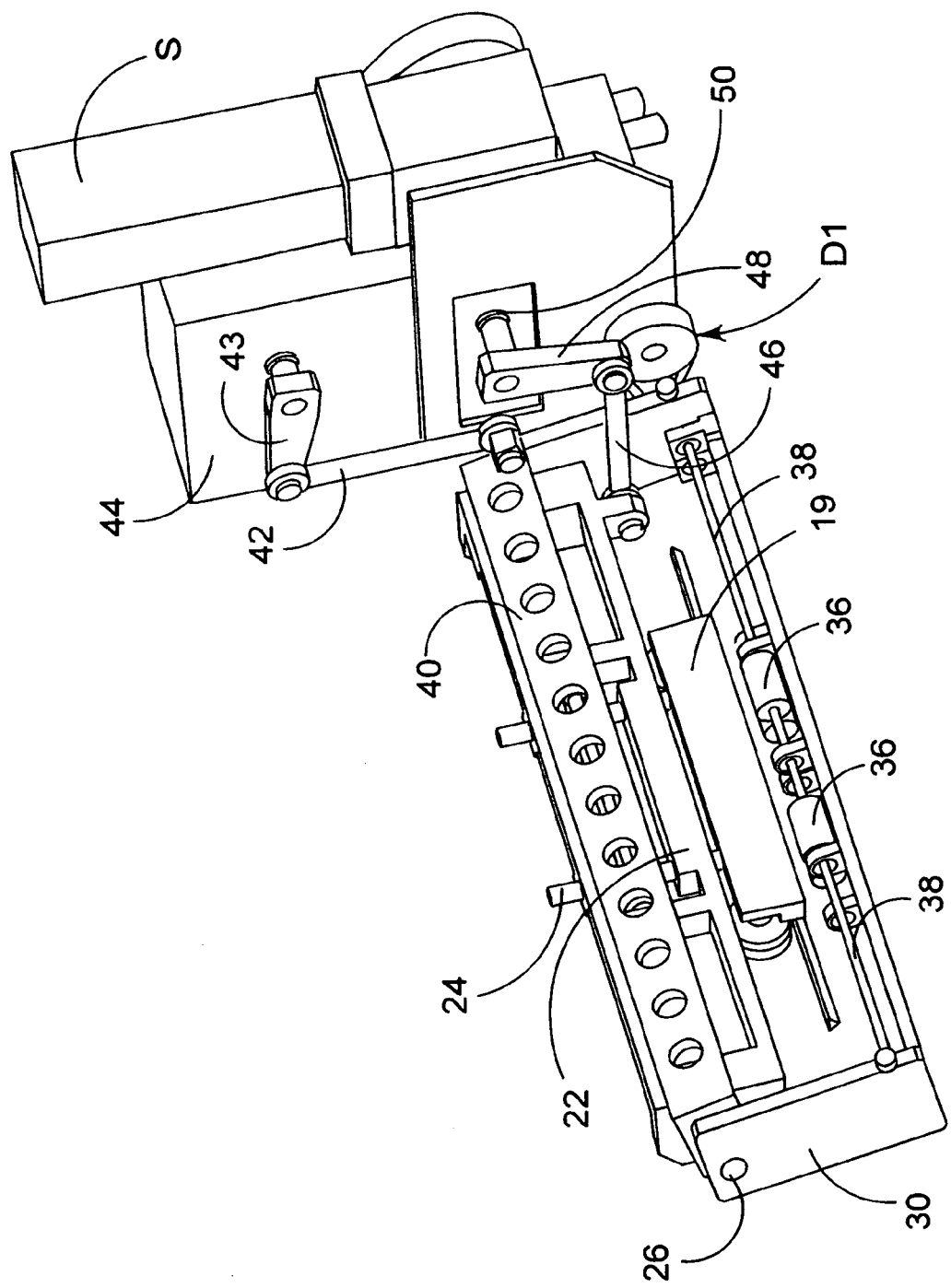
Figure 3:
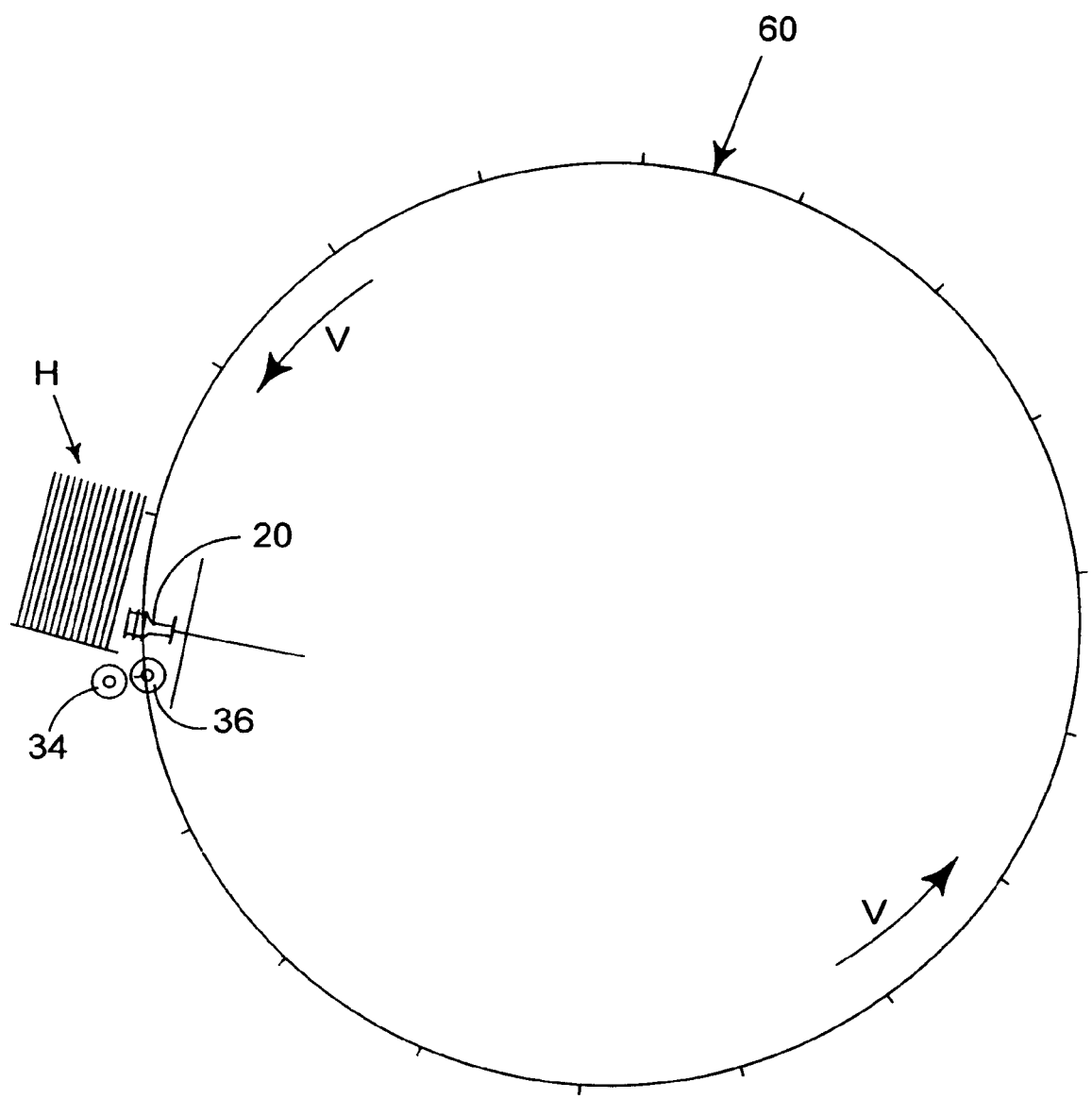
FIG. 3 is a schematic view showing the feeder and a blank transfer mechanism of the packaging machine.

Referring now to FIGS. 1, 2 and 3 of the drawings, there is shown a feeder mechanism 10 of a machine for processing carton blanks. The upstream end of the packaging machine includes a hopper H in which a multiplicity of cartons in flat collapsed condition are held ready for processing. As shown in FIG. 3, the cartons are removed from the hopper H sequentially by a feeder mechanism 10 and transferred to a blank transfer mechanism 60 or conveyor for further processing.

The feeder mechanism 10 comprises a carton pick up means 12 for withdrawing the lower most collapsed carton from the hopper. In this embodiment the carton pick up means comprises a plurality of suction cups 14, 16, 18, 20, for example four suction cups, which are each supported on cup holders and a frame 19. The cup holder frame 19 is fixedly mounted respectively on elongate support rods 24. In one class of embodiments, the rods 24 are slidably mounted respectively on a collar structure 22 which is rotatably mounted to shafts 26, 28. The shafts 26, 28 are generally supported at their ends by a suitable bearing structure but which is conventional and which is mounted to a side frame. Suitable driving mechanism, for example a servomotor, is provided to rotate the shaft 26, in a transverse manner Y-Y' (FIGS. 4, 5 and 7) described in more detail below.

In order to move the slide rods 24 in a reciprocal linear action through the collar structure 22, the slide rods are connected to support frame 40, shown in FIG. 2 for transmitting the linear motion from the drive means.

The feeder is powered by suitable drive means, for example a servo motor S, driving a drive belt D to transmit drive to a pair of indexers 44, 50. The indexers 44, 50 convert a continuous drive input into a reciprocating, and optionally intermittent, drive output.

In order to impart a linear motion to the pick up means, linkages 43 and 42 that are pivotally connected together, connect the drive output to the support frame 40. Thus as linkage 43 rotates to and fro in a reciprocal manner, the linkage 42 is caused to move in a linear motion in directions X-X' (FIGS. 1, 5, 6, 7 and 8), resulting in the linear motion of the frame 19 in the same direction.

Likewise, to impart a transverse motion to the pick up means, linkages 48 and 46 that are pivotally connected together, connect the drive output to the collar structure. Thus, as linkage 48 rotates to and fro in a reciprocal manner, the linkage 46 is caused to move in a linear motion in directions Y-Y', resulting in the transverse swinging motion (about the shafts 26, 28) of the frame 19 in the same direction.

In this embodiment, it is envisaged that a vacuum break is provided in the feeder mechanism 10 which is used in conjunction with a vacuum supply to set the vacuum connection and cut off points thereby determining when the carton is held by the feeder mechanism 10.

Whilst the use of vacuum cups to supply cartons to the conveyor is preferred, it is envisaged that the present invention can be used or adapted to be used with other types of pick up means, for example grippers, without departing from the scope of the invention.

In order to accelerate the cartons, once withdrawn from the hopper H, acceleration wheels 34, 36 are provided. In this embodiment, there comprises two pairs of acceleration wheels positioned adjacent each other to provide a nip in-feed point N to receive a leading edge of the carton and to allow the carton blank to pass there through. The acceleration wheels 34, 36 are mounted to drive shafts 32, 38 which are driven by suitable drive means, D1.

The acceleration wheels 34, 36 are mounted to the feeder frame 30, which can be fitted to a packaging machine or supplied as a separate module. It is envisaged that the feeder mechanism can be fitted to new machinery or fitted to existing machinery on a retro-fit basis.

The hopper H is, preferably, a "gravity feed" type whereby the carton blanks are held in the hopper at an incline to provide a positive feed so a continuous supply of cartons is maintained.

The transfer process will now be described with reference to FIGS. 4 to 9. In order for the blank to be transferred from the inclined position, the feeder mechanism 10 continuously and sequentially feeds cartons from the hopper to the in-feed transfer mechanism which is rotating constantly in direction V indicated by the arrow, shown in FIG. 3.

The first step shown in FIG. 4 is to move the pick up means 12 in a transverse direction Y towards the hopper H. The suction cup 20 is moved into contact with side wall of carton. A vacuum is then applied to the set of suction cups by the vacuum supply. Thus, the carton is withdrawn by moving the pick up means in a transverse direction Y'. As soon as the carton is moved in the transverse direction then the suction cup 20 is moved in a linear downward motion X to move the carton towards the acceleration wheels 34, 36, shown in FIG. 5. Thereafter the carton is received in the nip in-feed of the wheels and is accelerated, shown in FIG. 6. The vacuum is then maintained during this transfer stage so that the suction cups hold the side wall of the carton.

Once the carton is deposited at the wheels, the vacuum break disconnects the vacuum supply from the suction cups to release the carton, by moving the suction cup in a transverse and linear movements X', Y', shown in FIG. 7.

The acceleration wheels 34, 36 accelerate the blank which is then placed in contact with a leading lug of the conveyor set shown generally at FIG. 8. The lugs maintain the position of the carton and move the carton downstream to a set up station. At the same time, the suction cup 20 is returned to the start position shown in FIG. 9.

It will be seen from FIGS. 4 to 9 that as the feeder withdraws and manipulates the cartons, they also undergo a translation about the path of the rotary movement of the transfer mechanism.

The feeder mechanism 10, the transfer mechanism are controlled by a controller to coordinate the throughput speeds of the cartons.

It is envisaged that the adjustments to the machine are controlled by computer program which enables adjustment to be automated thereby minimizing machine downtime. For example, speed of the feeder can be increased or decreased if it is required or the acceleration vectors can be increased or decreased to change the angle of movement.

It has been found that by separating the withdrawal function and the acceleration of the carton into two discrete functions, that the throughput speeds can be increased as the risk of carton damage is reduced.

A machine according to the present invention is adjustable in a number of respects so as to be able to process cartons containing numerous configurations of groups of articles to create a range of carton size and shape, for example, four bottles to eight bottles without undue amounts of downtime being spent in adjusting the machines. Indeed, the machine can be readily adapted to process cartons to produce a wide range of cartons having numerous article group configurations.

What is claimed is:

1. An apparatus for sequentially manipulating from a supply point of a hopper carton blanks each having a contacting panel and for transferring the blanks to an in-feed end of a packaging machine, the apparatus comprising carton pick up means for sequentially engaging said contacting panel and for withdrawing from the hopper a blank, wherein the carton pick up means is connected to a swingable collar structure by a holder frame and moveable in a first direction transverse plane to said contacting panel of a blank in the hopper, the holder frame being slidably mounted on the collar structure for linear movement in a second direction transverse to the first direction to transverse the blank to said in-feed end for further processing.

2. An apparatus as claimed in claim 1 wherein the blank is transferred to acceleration means at the said in-feed end to be accelerated to match the velocity of the packaging machine.

3. An apparatus according to claim 1 wherein the linear movement of said holder frame immediately prior to and during withdrawal of a blank from the hopper is arrested for a brief interval by action of a cam controlled cam bar which is movable radially during such brief interval and which is operably connected to said carton pick up means.

4. An apparatus according to claim 1 wherein said carton pick up means comprises a vacuum supply and a suction cup.

5. An apparatus according to claim 1 wherein said contacting panel comprises a side wall of a carton formed from the blank.

6. An apparatus according to claim 1 wherein the apparatus is driven by a servo motor.

7. An apparatus according to claim 1 wherein a controller controls the velocity of the linear movement of the holder frame and the velocity of the movement of the carton pick up means in the first direction.

8. An apparatus according to claim 1 wherein said holder frame is connected to the collar structure by a slidable rod for said linear movement.

9. An apparatus according to claim 2 wherein the collar structure is swingably connected to the acceleration means by a feeder frame.

10. An apparatus according to claim 2 wherein the holder frame is connected to the collar structure by a slidable rod for said linear movement.

\* \* \* \* \*